Figure 1:
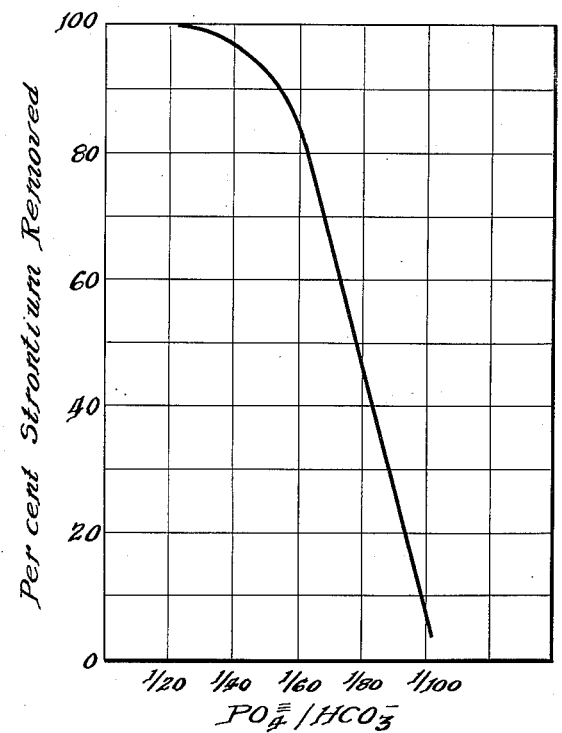

INVENTORS
Donald W. Rhodes
John R. McHenry
Lloyd L. Ames, Jr.
Attorney

United States Patent Office 3,032,497
Patented May 1, 1962

3,032,497
METHOD OF REMOVING STRONTIUM IONS
Donald W. Rhodes, Idaho Falls, Idaho, John R. McHenry, near Oxford, Miss., and Lloyd L. Ames, Jr., Richland, Wash., assignors to the United States of America as represented by the United States Atomic Energy Commission
Filed Dec. 24, 1958, Ser. No. 782,985
3 Claims. (Cl. 210—38)

The invention relates to a novel method of removing from solutions strontium ions including those of the radioactive isotope $Sr^{90}$, or radiostrontium, particularly when such ions are present in very small or "trace" amounts not economically removable by presently known methods.

$Sr^{90}$, one of the products of all presently known nuclear fission reactions, combines two properties which make it highly dangerous to public health: a close chemical relationship to calcium giving rise to a "bone-seeking" tendency whereby it becomes lodged within the bones of human beings and animals, and an unusually long life, its "half-life" being about twenty years. Even "trace" amounts of this radioactive isotope or nuclide are considered a menace to the well being of communities if they find their way into the public water supply through ground seepage, or into the milk supply since, due to its chemical kinship to calcium, it can be carried through the calcium in the milk of dairy cows which have grazed on herbage containing it. Once ingested by a human being or animal $Sr^{90}$ finds its way into the predominantly calcium structure of the bones where due to its long life it remains for all practical purposes, permanently. No means of dislodging it is presently known, nor is there much expectation among scientists that such means will be found within the foreseeable future, if ever.

Since, as above stated, $Sr^{90}$ is formed in all known fission reactions, all nuclear reactors, which are now becoming quite numerous throughout the world, produce, either directly or indirectly, solutions containing ions of this isotope, which require treatment to remove it. Certain reactors, such as those where the fissionable material is in solution or in a slurry with a liquid moderator, produce the ions directly; other types of reactors are designed to confine their fission products within metal covered or "canned" fuel rods while the reactor is in operation, but after the fuel rods become "spent" it is necessary to dissolve them in some solvent, usually an aqueous solution of nitric acid, in order to recover the unaffected original fissionable material, the plutonium which has been produced by the neutron radiation, both of which are very valuable, and the fission products, many of which have economic value.

In any event, at some stage in the operation of all kinds of nuclear reactors a solution containing $Sr^{90}$ ions is encountered. There are a number of known methods by which the fission products, including $Sr^{90}$, may be removed in a gross sense, but the present invention is addressed not to this stage of the process but to the removal of the "trace" or residual concentrations remaining in the filtrate or residual or waste solutions after the conventional, large scale methods have done their utmost. These residual concentrations are often of a magnitude that cannot be detected by conventional chemical methods such as weighing, titrating, spectroscopy and the like, and can only be detected by radiation counting devices. The method of the invention could be used to remove strontium from solutions on a large scale but it is probably less efficient and more expensive than other methods for this purpose. On the other hand, it will surpass known methods in its ability or economy in removing trace concentrations of strontium from large quantities of such residual or waste solutions and it is therefore important from a public health standpoint. The method of the invention will remove all strontium ions whether of mass number 90 or some other mass number, but its main utility is, of course, due to the removal of the isotope $Sr^{90}$ which carries the dangerous radioactivity above-described.

The suggestion has been advanced of constructing large, liquid-tight storage tanks to store the residual solutions above-described until all radioactivity had spent itself. This, while superficially plausible, is not possible either economically or physically; the costs of such a program are economically unbearable, and the hazards of earthquakes, lightning, corrosion, defective steel plates, defective workmanship and the like in the construction and erection of the tanks make complete physical security of the dangerous solutions unattainable. If the erection of nuclear reactors is not to be brought to a complete halt some method must be found whereby large volumes of the residual solutions from their operation may be safely discharged into rivers, watercourses or disposal pits in the ground stripped of practically all radioactivity including that attributable to $Sr^{90}$.

Containment tanks being impractical, it has been suggested that the residual solutions be dumped into pits in the ground where the soil is calcareous. It was reasoned that since the health problem referred to is due originally to an ion exchange ability of the phosphate and carbonate anions of the calcium salts of the bones, whereby calcium atoms are displaced by those of strontium, this unfortunate circumstance could be turned to advantage by discharging solutions containing strontium into soils containing such salts. Soils containing calcium carbonate are to be found in many places throughout the world; in fact, all "sweet" soils are characterized by the presence of sufficient calcium, usually in the carbonate form, to prevent their having an acidic reaction. Calcium phosphate is present in significant amounts only in isolated localities, but in either case it appeared probable that the atomic displacement reaction above-described would take place in the soils in the same manner as it did in the bones. While not wholly incorrect, this conjecture proved to lead to rather disappointing results; the carbonate and phosphate anions while possessing sufficient ion exchange capacity to create the health problem within men and animal referred to, did not have enough of it to make for efficient removal of strontium either in the soil or in laboratory tests where the pure salts were employed as ion exchange materials. This seemingly paradoxical statement is, of course, but another consequence of the huge difference in orders of magnitude inherent in the equivalence of mass and energy in the nuclear field, whereby amounts of matter once looked upon as inconsequential become highly significant when translated into terms of energy.

It is, accordingly, an object of the invention to devise a method whereby strontium ions may be removed from solutions.

It is a further object to devise a method where trace or residual concentrations of strontium ions may be removed from solutions.

It is a further object to devise a method whereby removal of such trace or residual concentrations may be removed in a practical, economical manner.

The invention is based upon the surprising discovery that while either calcium carbonate or calcium phosphate alone make but indifferent ion exchange materials for the removal of $Sr^{90}$ ions from solutions, calcium and other alkaline earth phosphates, as well as other metal phosphates, in the process of being created through the reaction of carbonates or other salts with phosphate ions, make highly efficient ion exchange materials for this purpose. A typical, but, of course, not the only reaction whereby a metal phosphate is created is the following:

$$5CaCO_3 + NaOH + 3Na_3PO_4 \rightarrow Ca_5(PO_4)_3(OH) + 5Na_2CO_3$$

Chemists are familiar with a number of similar reactions whereby phosphate salts are created; our invention is based upon the discovery that if strontium is present during the course of these "main" reactions it will be found to be removed from the solution of the reaction, even if present in only trace, or residual amounts. It has been suggested that this phenomenon is due to the fact that when the phosphate salt ionic lattice is being formed the strontium ions are taken into the lattice structure to a much greater extent than would be the case after the lattice formation has been completed. We do not, however, wish to be bound by this or any other theory explaining the operation of our invention; the facts are that we have found that during reactions resulting in the formation of phosphate salts $Sr^{90}$, even in trace amounts, is removed from solution to a degree far in excess of anything predictable from its removal by previously formed salts of the same or related kinds, as will be more specifically set forth in the examples hereinafter set forth. Our invention is operative not only with any member of the alkaline earth metals but when the cation is any other metal capable of forming a phosphate; zinc carbonate, for example, when reacting with phosphate ions to form zinc phosphate removes $Sr^{90}$ to quite a high degree, and the reaction of $FeCO_3$ with phosphate ions has been found to have a capacity for removing the $Sr^{90}$ isotope, so that it is fairly to be inferred that numerous other metallic cations such as aluminum can be utilized in carrying out the invention although the alkaline earths are to be preferred when there is a choice. In any event, the crucial part of the invention is the addition of phosphate ions to the solutions containing the strontium; then, whatever metallic cations may be present in the soil into which the solutions are discharged will take $Sr^{90}$ as the phosphate salts are being formed; of course, various cations can act concurrently in this situation. When the solutions are treated in beds, columns, and similar man-made structures, calcite, a pure form of calcium carbonate, is the preferred packing material; it should be subdivided as far as possible to create the maximum surface on which the reaction may take place, but not so fine as to form a plastic mass in the case of beds, or to impede flow of the solution in the case of columns. Ordinary strontium carbonate could, of course, be used in carrying out the invention, but its toxicity and comparative high cost make it probable that calcite will always be preferred. Combinations of man-made structures and discharge into soil are possible; for example, the residual solutions containing $Sr^{90}$ and added phosphate ions can first be made to flow through a calcite column and then discharged into a pit in a calcareous soil, or into a bed of calcite and later discharged into the soil, or any combination of these. Proper pH and other conditions should, of course, be maintained to foster the main phosphate salt-forming reaction in all these cases; such details to assure that the "main" reactions take place are, of course, well known to the chemical arts. Such "main" reactions include, of course, the formation of phosphates from metallic oxides and hydroxides as well as from salts.

Our invention, however, is not to be taken as limited to the treatment of solutions resulting from the regular operation of nuclear reactors; it has, on the contrary, many applications wherever it is desirable to remove $Sr^{90}$. For example, with our invention a simple, economical means of purifying water may be achieved, to be used by persons in the vicinity of nuclear explosions or wherever contamination of the atmosphere by fission products is suspected. All that is required is a vessel filled with calcite; the water to be purified has sodium phosphate added to it and is then poured into the vessel, shaken and poured off after settling; this removes the $Sr^{90}$ and any unreacted phosphate remaining in the water is, for all practical purposes, harmless. Alternatively a column of calcite can be used through which the water with added phosphate ions flows slowly.

Our invention, and its superiority over ion exchange methods utilizing salts with completed lattices, will be made more apparent through the following specific examples. The first two examples will show the limited removal of strontium by previously formed salts, calcium carbonate and calcium phosphate, as ion exchange materials, and the last two will illustrate the surprisingly improved results when removal is carried out during a phosphate salt-forming reaction.

EXAMPLE I

A synthetic residual waste solution, or a solution of reagent grade laboratory materials in distilled water closely simulating an actual waste solution from a neutronic reactor, was made up containing 3 M $NaNO_3$, sufficient $Sr^{90}$—$Y^{90}$ to make a "count" of 100,000 d./m./ml. (decompositions per minute per milliliter), and sufficient NaOH to adjust the pH of the solution to 11.8. The "count" was made by removal of a measured aliquot of the solution, drying this on a one-inch square steel plate, which was then placed in a decomposition counter and the count recorded as is well known to the nuclear art. The expression "$Sr^{90}$—$Y^{90}$" has the same meaning as $Sr^{90}$ or radiostrontium, since whenever $Sr^{90}$ is present its decay product $Y^{90}$ necessarily accompanies it unless a chemical separation were made which, in the small amounts with which this application is concerned, is altogether impracticable. Measured amounts of the solutions were then caused to flow at the rate of 7 ml./cm.$^2$/hr. (milliliters per square centimeter per hour) through a column of calcite 12 cm. high and with an inner diameter of 1.9 cm. The calcite weighed 150 grams and its particle size was 1.0 to 0.25 mm. The term "column volume" as used in this and the other examples refers to a volume of the solution equal to the volume occupied by the calcite or other solid columnar material including the pore space, and therefore, for the column dimensions above-given, will be about 34.1 cc. The table below shows the results in terms of percentage of removal of strontium as determined by the same sampling, drying and counting procedure as described above, the sample being taken after the passage of the solution through the column, it being understood that each horizontal line refers to a separate run of a measured amount of solution through a column with fresh calcite in each run. For convenience in making comparisons the data above-described will be restated below the table in succinct laboratory notation form, as will also be done in the succeeding examples, the explanation of terminology and procedures above being applicable in succeeding examples also.

Table I

EXCHANGE CAPACITY OF CALCITE FOR Sr IN THE ABSENCE OF PHOSPHATE

| Column volumes: | Removal of strontium, percent |
|---|---|
| 0.98 | 32.7 |
| 1.96 | 22.1 |
| 2.61 | 10.8 |
| 3.92 | 6.6 |

Column: 150 grams of 1.0 to 0.25 mm. calcite.
Flow rate, 7 ml./cm.$^2$/hr.
Influent solution 3 M $NaNO_3$, 100,000 d./m./ml. $Sr^{90}$—$Y^{90}$.
pH adjusted to 11.8 with NaOH.

EXAMPLE II

A synthetic residual waste solution of 3 M $NaNO_3$, 2 milligrams per liter $Sr(NO_3)_2$ having a count of 1,000 decompositions per minute per milliliter and a pH of 6.8 was sampled, dried, and counted in the manner described in Example I, divided into measured portions for eight runs, flowed through columns of Canadian apatite, a naturally occurring calcium phosphate, of the same dimensions as those of Example I, and the effluent solutions counted to determine the percentage of strontium removal, as in that example. The table below gives the outcome of the runs, and the pertinent laboratory data appears beneath.

Table II
EXCHANGE CAPACITY OF APATITE FOR Sr IN THE ABSENCE OF PHOSPHATE

| Column volumes: | Removal of strontium, percent |
|---|---|
| 9.4 | 99.6 |
| 12.4 | 99.5 |
| 15.3 | 99.5 |
| 18.2 | 99.4 |
| 21.2 | 99.3 |
| 24.1 | 99.1 |
| 27.0 | 99.0 |
| 30.0 | 98.0 |

Column: 50 grams of 1.0 to 0.25 mm. Canadian apatite.
Flow rate, 7 ml./hr./cm.$^2$.
Influent solution 3 M $NaNO_3$, 2 mg./liter $Sr(NO_3)_2$, 1,000 d./m./ml. $Sr^{90}$—$Y^{90}$.

EXAMPLE III

A synthetic residual waste solution was made up consisting of 3 M $NaNO_3$, 0.05 M $Na_3PO_4 \cdot 12H_2O$, 2 mg. $Sr(NO_3)_2$ per liter having a count 100,000 decompositions per minute per milliliter and a solution pH of 11.1. From this solution was measured out four portions of 40 milliliters, or, for purposes of comparison with Examples I and II, 14.1 column volumes where the column length is 12 cm. and the inner diameter is 1.9 cm. as in those examples. Each of the portions was caused to flow through a column of the same inner diameter containing 400.0 milligrams of calcite of various particle sizes at such a rate that in each case the flow was completed in one hour. The results of these runs in tabular form, together with the pertinent laboratory solutions, were as follows:

Table III
RELATIVE AMOUNTS OF STRONTIUM REMOVED FROM THE SAME PHOSPHATE SOLUTION BY CALCITE OF VARIOUS GRAIN SIZE RANGES

| Calcite grain size range: | Removal of strontium, percent |
|---|---|
| 1.0 to 2.0 mm. | 33.9 |
| 0.25 to 1.0 mm. | 36.8 |
| 0.05 to 0.25 mm. | 69.2 |
| <0.05 mm. | 80.0 |

Solution-calcite contact time (hours), 1.0.
Calcite weight (mg.), 400.0.
Influent solution pH, 11.1.
Influent solution: 3 M $NaNO_3$, 0.05 M $Na_3PO_4 \cdot 12H_2O$, 2 mg. $Sr(NO_3)_2$ per liter, 100,000 d./m./ml. $Sr^{90}$—$Y^{90}$; 40 ml. solution per sample.

It will be observed that while the percentage of strontium removal is less in this example than in the preceding examples, the amount of ion exchange material used is far less, 400 milligrams as compared to 150 grams and 50 grams in Examples I and II respectively. Appropriate arithmetical adjustments make it apparent that the method of the invention is more efficient on a weight-for-weight basis of solid material used than either the method employing calcite or apatite, and even if it were urged that its superiority is less marked over the latter method there can be no question of its superiority over the former is most striking. So far as practical utility is concerned this is all to the good since soils containing calcium and other carbonates are quite common whereas soils containing phosphates are comparatively rare and often far removed from sites of neutronic reactors. Our invention therefore fulfills the practical need for a method whereby wastes can be disposed of in the abundant carbonate soils, so that the choice of sites for reactors need not be limited by proximity to unusual soil types.

EXAMPLE IV

To further illustrate the utility of the invention by proving that the presence of phosphate ion is critical in bringing about strontium ion removal by calcium carbonate, eight equal portions of a sampled, counted synthetic waste solution of the general type previously described were run through column of 34 cc. volume through 50 grams of calcite of 1.0–0.25 mm. particle size, each portion having added to it varying amounts of sodium bicarbonate and sodium phosphate to make for different phosphate ion to bicarbonate ion ratios in each portion. The results were as indicated by the curve in FIGURE 1 where the percent of strontium removal as the ordinate is plotted against the phosphate ion to bicarbonate ion ratio as the abscissa. The pertinent laboratory data is set forth below.

FIGURE 1.—The removal of $Sr^{+2}$ as influenced by the phosphate-to-bicarbonate ratio in the influent solution. At a ratio of 1/110, the apatite is replaced by the corresponding carbonate, and the carbonate is rapidly dissolved in this same influent solution.

Influent solution _____ $HCO_3^-$ and $PO_4^{-3}$ as below 100,000 d./m./ml. $Sr^{90}$—$Y^{90}$.
Calcite column weight (g) __ 50.
Calcite column volume (cc.) 34.
Calcite grain size (mm.) ____ 1.0–0.25.
Flow rate _____ 7 cc./cm.$^2$/hr.

EXAMPLE V

To investigate the operability of the invention with respect to the pH of the solution six portions of a synthetic waste solution were adjusted to pH of 6.8 through about 11.1, and subjected to the method of the invention as indicated in the laboratory data set forth below. The results are to be seen from the curve on FIGURE 2 where percent of strontium removed as the ordinate is plotted against pH as the abscissa.

Figure 2:
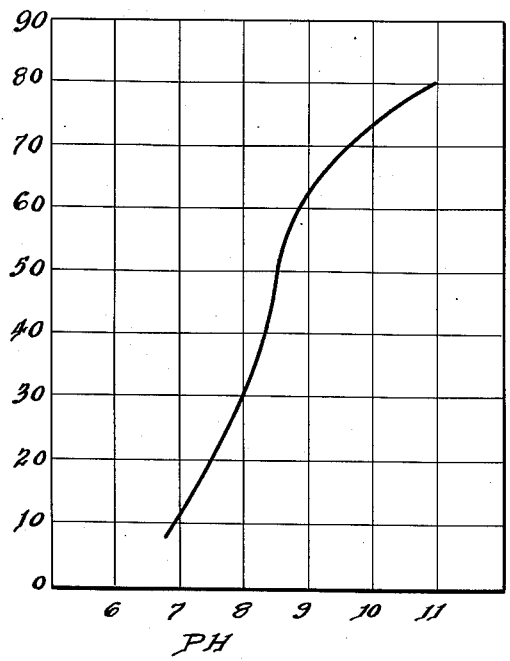

FIGURE 2.—Variation of Sr removal by calcite with influent solution pH.

Influent _____ 0.05 M $Na_3PO_4 \cdot 12H_2O$, 10,000 d./m./ml. $Sr^{90}$—$Y^{90}$.
Calcite grain size (mm.) __ 0.077.
Calcite weight (mg.) _____ 500.
Calcite-solution contact time (hr.) _____ 1.0.

EXAMPLE VI

In order to test the operation of the invention in a soil of about 0.5 to 1.5 percent $CaCO_3$ by weight and no substantial amounts of phosphate salts, into which it was proposed to discharge large quantities of waste residual solutions from neutronic reactors, large size columns were set up in a laboratory containing the soil and all other conditions were left as near as possible to those expected in the proposed disposal site. Tests were made to determine how many column volumes of waste solution could be put through the soil columns without "breakthrough," that is to say, before unacceptable counts of radiostrontium could be detected. Here again column volume of solution is to be taken as equal to the volume of the solid material in the column, in this case the soil sample. It was found that when the phosphate ion concentration of the solution was at 0.033 M breakthrough occurred when less than one column volume of the solution had passed through the soil column, whereas when the phosphate ion concentration was increased by the addition of sodium phosphate to 0.05 M over five times as much of the solution could be run through the soil column before breakthrough occurred.

EXAMPLE VII

A facility or "crib" for receiving the discharge of waste solutions from neutronic reactors was made by an excavation in the ground of overall square plan, fifteen feet deep at its deepest part, a smaller square 30 by 30 feet in the center, and with sloping sides with a slope of 1½ to 1 rising from the edges of the smaller square to the surface, thereby defining the overall square referred to. Five feet of 3-inch minimum gravel were laid in this excavation, on top of which four sections of 48-inch tile were set vertically with a branched 10-inch distribution tile lines connected to each in a symmetrical reticulated arrangement so that the distribution tile lines, which permitted seepage between each joint, distributed the effluent approximately uniformly over the entire facility at its level. A vent pipe was connected with each of the 48-inch tiles. Two feet of ¾-inch to 1½-inch gravel was laid on the coarse gravel so as to cover the distribution tile lines and one foot of ¼-inch to ¾-inch gravel was laid above that. The gravel was then graded level and a thickness of sisal kraft paper laid over it, after which the entire excavation was backfilled with the soil from the spoil pile. The vent lines extended to the surface of the backfill and were capped with glass wool vent filters.

The bottom of the crib above-described was 216 feet above the local water table and the soil beneath it contained 0.5 to 1.5 percent $CaCO_3$ by weight and no appreciable amounts of phosphate salts. Batches of neutronic reactor waste ranging from 100,000 to 800,000 gallons each have been put into the crib with phosphate ions added to bring the phosphate ion concentration up to about 0.05 M and the underground waters into which seepage from crib might be expected have been carefully monitored over an extended period. Samples of these waters analyzed by counting devices indicate that no unacceptable amounts of radioactivity from $Sr^{90}$ have been present.

Having thus described our invention, we claim:

1. A method of removing strontium from water comprising adding a phosphate salt and causing the resulting solution to flow through a calcite column.

2. A method of removing strontium ions from a solution comprising the addition of phosphate ions to said solution and then bringing it into contact with an inorganic compound selected from the class consisting of alkaline earth metal carbonates, zinc carbonate and ferrous carbonate.

3. A method of removing strontium ions from a solution, comprising the addition of phosphate ions to said solution and the bringing it into contact with a solid, porous, granular, substantially water-insoluble preformed calcium carbonate.

References Cited in the file of this patent

UNITED STATES PATENTS

| | | |
|---|---|---|
| 2,114,576 | Schinman | Apr. 19, 1938 |
| 2,766,204 | Lowe | Oct. 9, 1956 |

OTHER REFERENCES

Nesbitt et al.: "The Removal of Radioactive Strontium From Water by Phosphate Coagulation," U.S.A.E.C. Publication NYO-4435, Feb. 15, 1952, page 65.

"Wash Atomic Wastes," Science News Letter, Sept. 25, 1954, vol. 66, No. 13, page 198.